United States Patent
Cummins

[19]

[11] Patent Number: 6,067,647
[45] Date of Patent: May 23, 2000

[54] METHOD AND APPARATUS FOR INSERTING AN ERROR SIGNAL ONTO A BIDIRECTIONAL SIGNAL LINE

[75] Inventor: T. Scott Cummins, Phoenix, Ariz.

[73] Assignee: Intel Corporation, Santa Clara, Calif.

[21] Appl. No.: 09/146,455

[22] Filed: Sep. 2, 1998

[51] Int. Cl.⁷ .................................................. G06F 11/00
[52] U.S. Cl. ........................................................ 714/703
[58] Field of Search ................................. 714/703, 715, 714/799

[56] References Cited

U.S. PATENT DOCUMENTS

| | | | |
|---|---|---|---|
| 4,903,270 | 2/1990 | Johnson et al. | 714/703 |
| 5,001,712 | 3/1991 | Splett et al. | 714/703 |
| 5,058,112 | 10/1991 | Namitz et al. | 714/703 |

Primary Examiner—Phung M. Chung
Attorney, Agent, or Firm—Thomas R. Lane

[57] ABSTRACT

One embodiment of the present invention includes an apparatus for inserting an error signal onto a bidirectional signal line. The apparatus includes a first switch for decoupling a first terminal of the bidirectional signal line from a second terminal of the bidirectional signal line, a second switch for coupling the error signal to the first terminal, and a third switch for coupling the error signal to the second terminal. The apparatus also includes a control unit for generating a switch enable signal. When the switch enable signal is deasserted, the first switch closes and the second and third switches open, such that the first terminal is coupled to the second terminal. When the switch enable signal is asserted, the first switch opens and the second and third switches close, such that the error signal is coupled to the first and second terminals.

19 Claims, 5 Drawing Sheets

METHOD AND APPARATUS FOR INSERTING AN ERROR SIGNAL ONTO A BIDIRECTIONAL SIGNAL LINE

FIELD OF THE INVENTION

The invention relates to the field of validating the functionality of electronic systems, and more particularly to the field of validating the functionality of error detection and/or correction features of electronic systems.

BACKGROUND OF THE INVENTION

Error detection and/or correction is a common feature in electronic systems, particularly in the memory controllers of computer systems. Therefore, methods and apparatus for validating the functionality of these features are needed. A well known way to validate error detection/correction functionality is to insert an error signal onto a signal line within the system, and then determine if the system responds properly to the error signal. A prior approach to inserting an error signal onto a bidirectional signal line involves determining the expected state and direction of the signals on the signal line at any given time by tracking the transactions occurring over the bidirectional signal line, then overdriving the master of the bidirectional signal line with the error signal at an appropriate time.

One problem with this approach is that the logic needed to track the transactions on the bidirectional signal line is typically quite complex. Another problem with this approach is that the error insertion is synchronized to specific activity on the bidirectional signal line, so errors can only be inserted at specific times, thus limiting the randomness of the validation effort. A third problem with this approach is that the need to overdrive masters of differing drive strengths leads to a design choice of either increasing the cost or decreasing the capability of the error insertion driver hardware.

Therefore, a novel approach to inserting an error signal onto a bidirectional signal line has been developed.

SUMMARY OF THE INVENTION

An apparatus for inserting an error signal onto a bidirectional signal line is disclosed. The apparatus includes a first switch for decoupling a first terminal of the signal line from a second terminal of the signal line, a second switch for coupling the error signal to the first terminal, and a third switch for coupling the error signal to the second terminal. The apparatus also includes a control unit for generating a switch enable signal. The first, second, and third switches are responsive to the switch enable signal.

DETAILED DESCRIPTION OF A PREFERRED EMBODIMENT

A novel approach to inserting an error signal onto a bidirectional signal line is described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

One embodiment of the present invention includes an apparatus for inserting an error signal onto a bidirectional signal line. The apparatus includes a first switch for decoupling a first terminal of the bidirectional signal line from a second terminal of the bidirectional signal line, a second switch for coupling the error signal to the first terminal, and a third switch for coupling the error signal to the second terminal. The apparatus also includes a control unit for generating a switch enable signal. When the switch enable signal is deasserted, the first switch closes and the second and third switches open, such that the first terminal is coupled to the second terminal. When the switch enable signal is asserted, the first switch opens and the second and third switches close, such that the error signal is coupled to the first and second terminals.

Unlike the prior approaches, no logic is needed to track the transactions on the bidirectional signal line, thus design complexity and cost can be reduced. In addition, the error insertion need not be synchronized to specific activity on the bidirectional signal line, allowing errors to be inserted at pseudo-random times for more efficient validation. Furthermore, the error insertion process does not require the overdriving of the master of the bidirectional signal line, thus freeing the the error insertion hardware design from constraints imposed by a need to overdrive masters of differing drive strengths.

Figure 1:
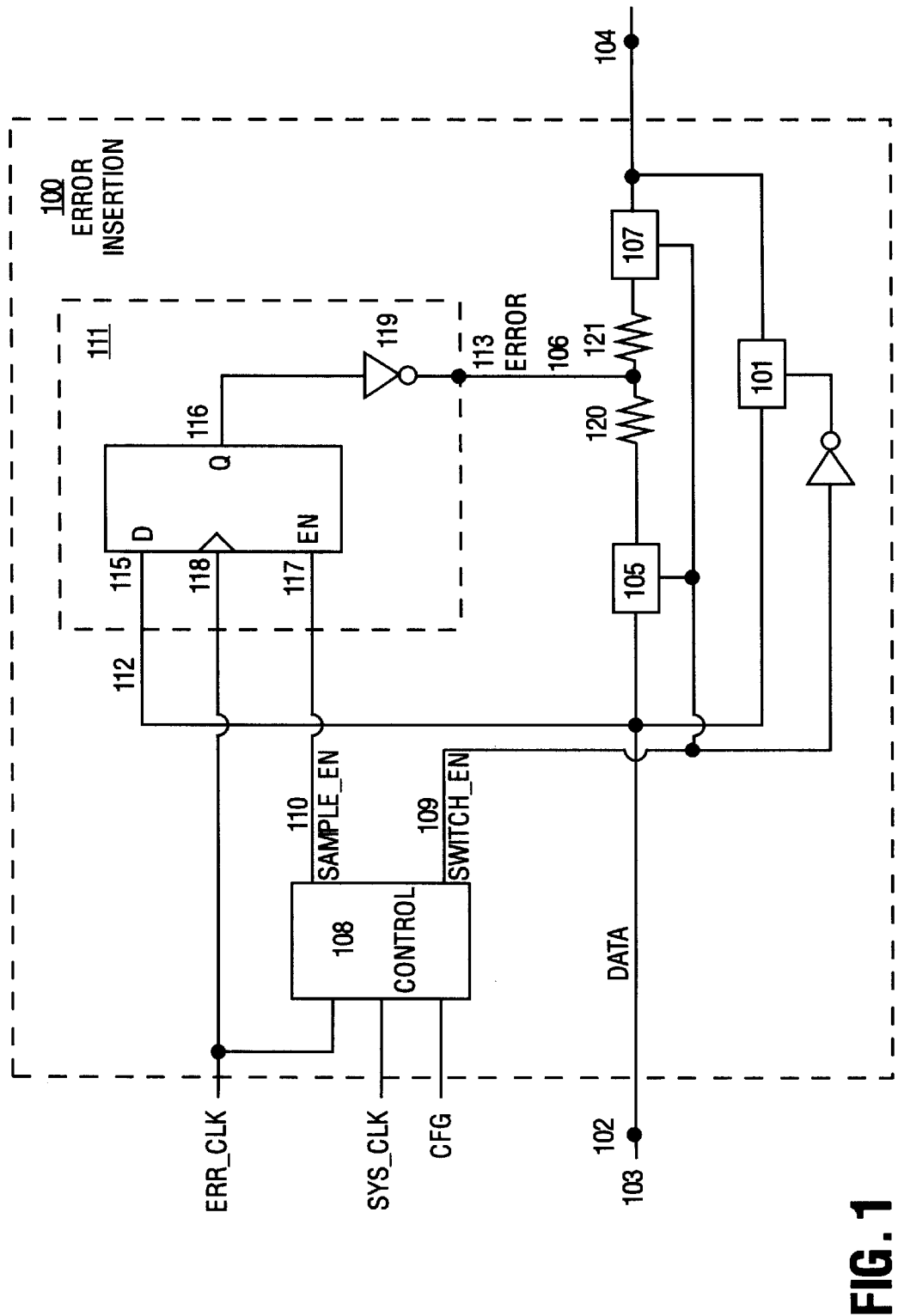
FIG. 1 is a block diagram illustrating one embodiment of the apparatus of the present invention.

One embodiment of the apparatus of the present invention described above is illustrated in FIG. 1. In FIG. 1, error insertion apparatus 100 includes switch 101 tor decoupling terminal 102 of bidirectional signal line 103 from terminal 104 of bidirectional signal line 103, switch 105 for coupling an error signal (ERROR) on signal line 106 to terminal 102, and switch 107 for coupling ERROR to terminal 104. As used in this specification, the term switch can mean any of a variety of types of switches, including, but not limited to, transistor switches, such as field effect or bipolar transistor switches, and mechanical switches. As used in this specification, the term terminal can mean any of a variety of types of electrical connectors, including, but not limited to, portions of conductive lines or wires, pads, pins, and solder bumps.

Error insertion apparatus 100 also includes control unit 108 for generating a switch enable signal (SWITCH_EN) on signal line 109 and a sample enable signal (SAMPLE_EN) on signal line 110. Switches 101, 105, and 107 are responsive to SWITCH_EN. In this embodiment, when SWITCH_EN is asserted, switch 101 opens to decouple terminal 102 from terminal 104, and switches 105 and 107 close to couple signal line 106 to terminals 102 and 104, thereby inserting ERROR onto bidirectional signal line 103.

Error insertion apparatus 100 also includes error generation circuit 111, which has input terminal 112 coupled to terminal 102, and output terminal 113 for providing ERROR to signal line 106. Error generation circuit 111 includes bistable element 114 for sampling a signal (DATA) on bidirectional signal line 103 and generating a sample of DATA. Bistable element 114 has input terminal 115 coupled to input terminal 112 of error generation circuit 111, output terminal 116 coupled to output terminal 113 of error generation circuit 111, and sample enable terminal 117 for receiving SAMPLE_EN. As used in this specification, the term bistable element can mean any of a variety of types of circuit elements having two stable states, including, but not limited to, flip-flops and latches. In this embodiment, bistable element 114 is a D type flip-flop having clock input terminal 118 for receiving an error insertion clock signal (ERR_CLK). In this embodiment, error generation circuit 111 also includes inverter 119 for inverting the sample of the signal to generate ERROR. In another embodiment, bistable element 114 has an inverted output terminal for generating ERROR.

Figure 2:
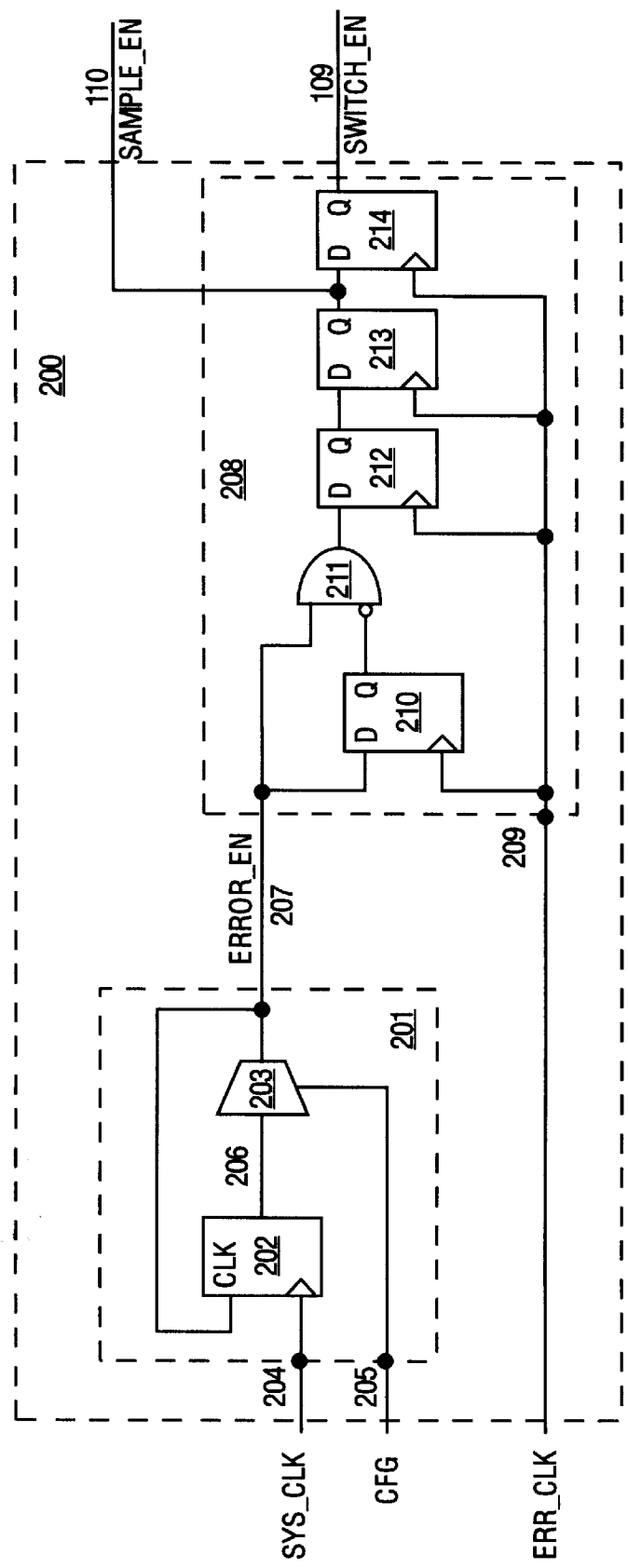
FIG. 2 is a block diagram illustrating one embodiment of the control unit of the present invention.

Error insertion apparatus 100 also includes resistor 120 coupled between output terminal 113 and switch 105, and resistor 121 coupled between output terminal 113 and switch 107, for preventing contention on the driving side of bidirectional signal line 103. For example, when switch 105 is closed while a device coupled to bidirectional signal line 103 is driving terminal 102 high and error generation circuit 111 is driving output terminal 113 low, the voltage drop across resistor 120 prevents contention on bidirectional signal line 103. One embodiment of control unit 108 is illustrated in FIG. 2. In FIG. 2, control unit 108 includes control circuit 200 for generating SWITCH_EN on signal line 109 and SAMPLE_EN on signal line 110. Control circuit 200 includes counter circuit 201 for generating a period for SWITCH_EN and SAMPLE_EN being a multiple of the period of a system clock signal (SYS_CLK).

Counter circuit 201 includes counter 202, multiplexer 203, system clock input terminal 204 for receiving SYS_CLK, and configuration signal input terminal 205 for receiving a configuration signal (CFG). Counter 202 is an N bit counter for generating N counter output signals on counter output bus 206, where N can be any positive integer. Counter 202 is clocked by SYS_CLK and cleared by an output of counter circuit 201, the error enable signal (ERROR_EN). Multiplexer 203 is an N bit multiplexer for generating ERROR_EN on signal line 207 by selecting one of the N counter output signals based on CFG.

Since counter 202 is clocked by SYS_CLK, the period of each of the counter output signals will be different multiple of the period of SYS_CLK. Thus, the period of ERROR_EN will be the multiple of the period of SYS_CLK chosen according to the value of CFG. In one embodiment, where N is four, CFG is a two bit signal allowing the selection of one, two, four, or eight periods of SYS_CLK between the periodic assertions of ERROR_EN. Since counter 202 is cleared by ERROR_EN, each assertion of ERROR_EN will clear counter 202 and result in ERROR_EN being asserted for one period of SYS_CLK. As will be described subsequently, the period generated for ERROR_EN will determine the period for SWITCH_EN and SAMPLE_EN.

Control circuit 200 also includes delay circuit 208 for delaying the assertion of SAMPLE_EN from the assertion of ERROR_EN, and the assertion of SWITCH_EN from the assertion of SAMPLE_EN, each by at least one half period of ERR_CLK. The frequency of ERR_CLK is a multiple of the frequency of SYS_CLK. Delay circuit 208 has error insertion clock input terminal 209 for receiving ERR_CLK.

Delay circuit 208 includes bistable element 210 and gate 211 for generating a pulse based on the assertion of ERROR_EN, and bistable elements 212 and 213 for delaying the assertion of SAMPLE_EN and SWITCH_EN, and bistable element 214 for delaying the assertion of SWITCH_EN. In this embodiment, each of bistable elements 210, 212, 213, and 214 are D type flip-flops clocked by ERR_CLK. According to the configuration of FIG. 2, bistable element 210 and gate 211 will generate a pulse having a duration equal to the period of ERR_CLK whenever ERROR_EN becomes asserted. Each pulse will be pass through bistable elements 212 and 213 to cause the assertion of SAMPLE_EN to be delayed by two periods of ERR_CLK from the assertion of ERROR_EN. Each pulse will also pass through bistable element 214 to cause assertion of SWITCH_EN to be delayed by one period of ERR_CLK from the assertion of SAMPLE_EN.

Figure 3:
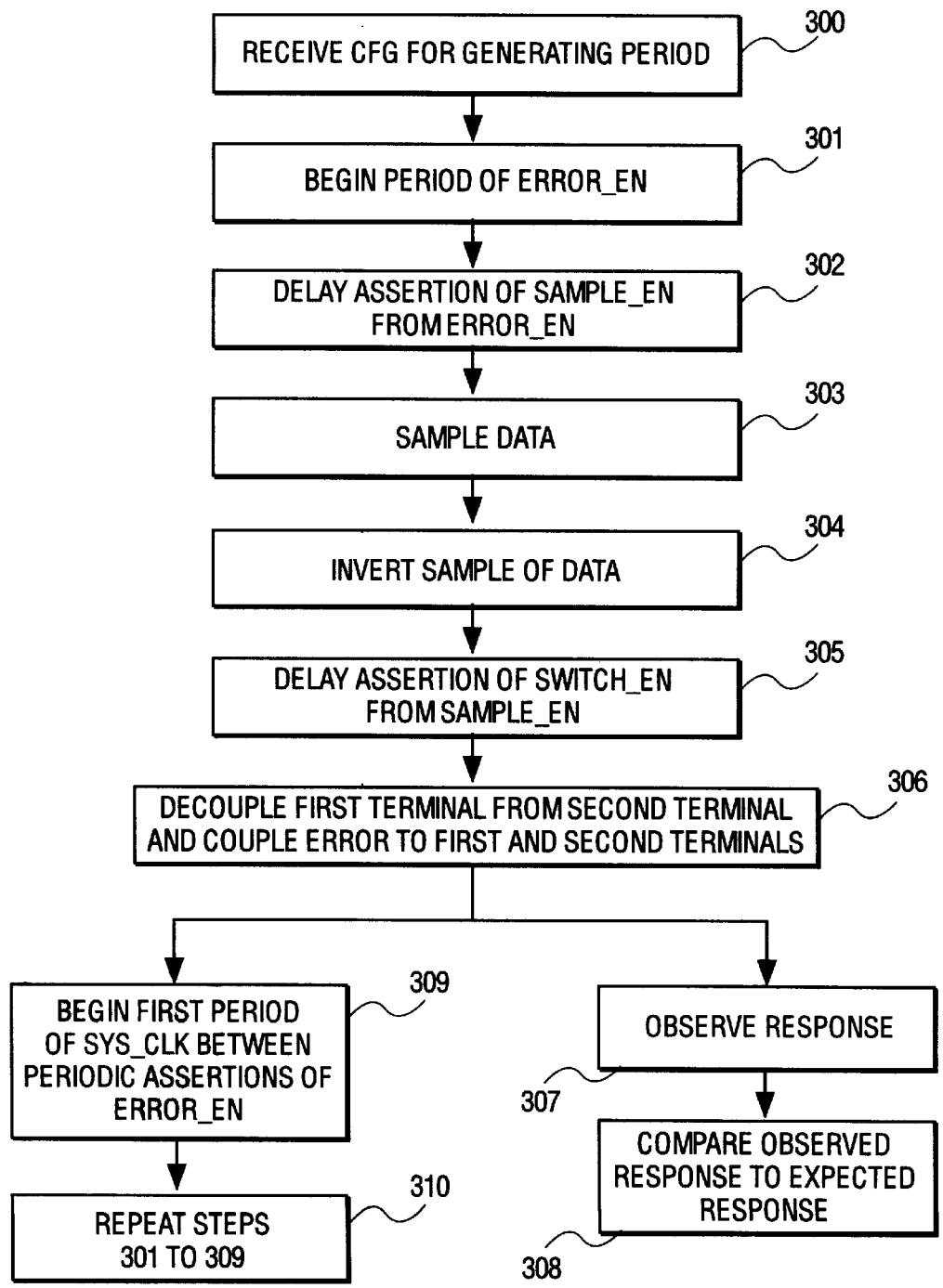
FIG. 3 is a flow chart illustrating one embodiment of the method of the present invention.
Figure 4:
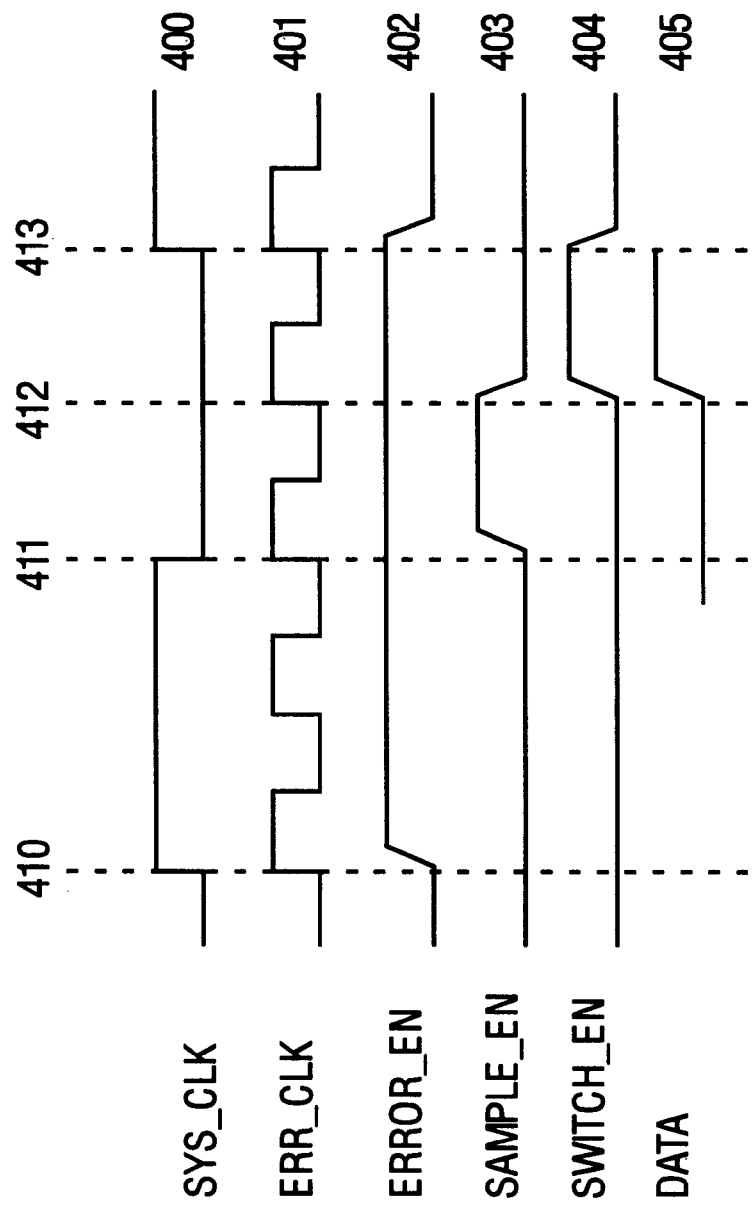
FIG. 4 is a timing diagram illustrating the operation of the apparatus of FIGS. 1 and 2.

The operation of the apparatus of FIGS. 1 and 2 is illustrated in the flowchart of FIG. 3 and the timing diagram of FIG. 4. FIG. 3 is a flowchart illustrating one embodiment of the method of the present invention in a method for validating the capability of an electronic system to detect an error signal on a bidirectional signal line. FIG. 4 is a timing diagram of the operation of the apparatus of FIGS. 1 and 2, including waveform 400 for SYS_CLK, waveform 401 for ERR_CLK, waveform 402 for ERROR_EN, waveform 403 for SAMPLE_EN, waveform 404 for SWITCH_EN, and waveform 405 for DATA. In this embodiment, the frequency of ERR_CLK is four times the frequency of SYS_CLK. Also, in this embodiment, ERR_CLK, ERROR_EN, and SAMPLE_EN are active high signals.

In step 300 of FIG. 3 and sometime prior to time 410 of FIG. 4, counter circuit 201 receives CFG for generating the period for ERROR_EN, SAMPLE_EN, and SWITCH_EN, which is a multiple of the period of SYS_CLK. At time 410 in FIG. 4, switch 101 is closed, switches 105 and 107 are open, and SYS_CLK rises. Based on the rising edge of SYS_CLK at time 410, ERROR_EN becomes asserted due to the operation of counter circuit 201. The assertion of ERROR_EN marks the beginning of a period of ERROR_EN, corresponding to a period of enabling error insertion on bidirectional signal line 103, as indicated in step 301 of FIG. 3.

At time 411 in FIG. 4, DATA is valid with a value of a logical zero, and ERR_CLK rises. Based on the rising edge of ERR_CLK at time 411, SAMPLE_EN becomes asserted due to the operation of delay circuit 209. Thus, the assertion of SAMPLE_EN has been delayed by two periods of ERR_CLK from the assertion of ERROR_EN, as indicated in step 302 of FIG. 3. The assertion of SAMPLE_EN initiates step 303 of FIG. 3 by causing bistable element 114 to become enabled to sample DATA on the next rising edge of ERR_CLK, which occurs at time 412 in FIG. 4.

Based on the rising edge of ERR_CLK at time 412, bistable element 114 samples DATA to generate a sample of DATA, in this case a logical zero, as indicated in step 303 of FIG. 3. Then, in step 304 of FIG. 3, the sample of data is inverted by inverter 119 to generate ERROR on signal line 106, in this case a logical one.

Also based on the rising edge of ERR_CLK at time 412, SWITCH_EN becomes asserted due to the operation of delay circuit 209. Thus, the assertion of SWITCH_EN has been delayed by one period of ERR_CLK from the assertion of SAMPLE_EN, as indicated in step 305 of FIG. 3. The assertion of SWITCH_EN causes switch 101 to open, thereby decoupling terminal 102 from terminal 104, and causes switches 105 and 107 to close, thereby coupling ERROR on signal line 106 to terminals 102 and 104, as indicated in step 306 of FIG. 3. Thus, ERROR is inserted onto bidirectional signal line 103, so in this case, DATA, the signal on bidirectional signal line 103, is changed from a logical zero to a logical one.

At some time after time 412 in FIG. 4, the response of the electronic system to the error on bidirectional signal line 103 is observed using any of a variety of conventional techniques, as indicated in step 307 of FIG. 3, to generate an observed response. Then, the observed response is compared to an expected response using any of a variety of conventional techniques, as indicated in step 308 of FIG. 3, to validate the capability of the electronic system to detect the error on bidirectional signal line 103.

At time 413 in FIG. 4, SYS_CLK rises again, beginning the first period of SYS_CLK between the periodic assertions of ERROR_EN, as indicated in step 309 of FIG. 3. After the number of periods of SYS_CLK selected based on the value of CFG has elapsed, steps 301 to 309 are repeated. Thus, steps 301 to 309 are repeated according to the period generated based on CFG, as indicated in step 310 of FIG. 3.

Figure 5:
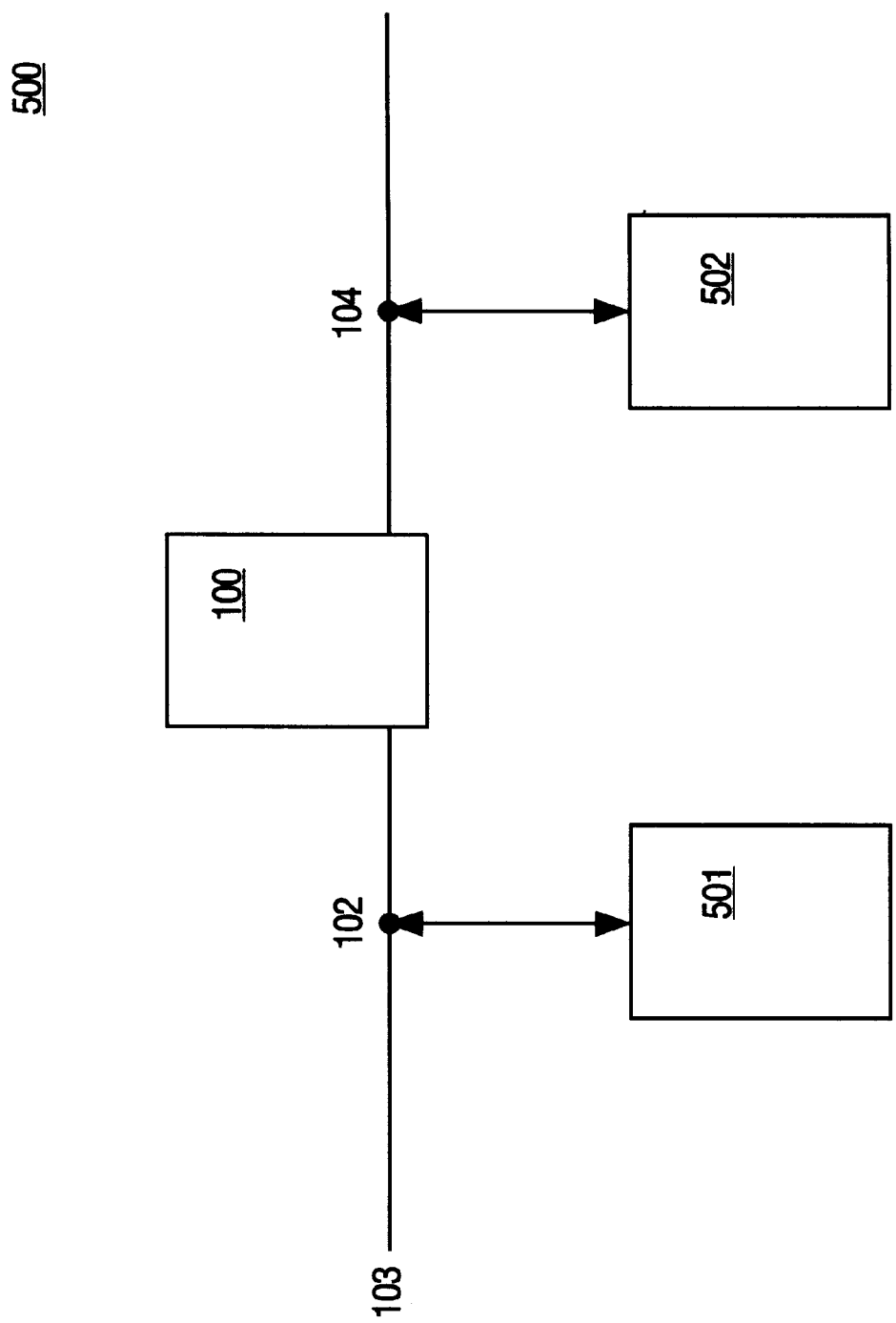
FIG. 5 is a block diagram illustrating one embodiment of the apparatus of the present invention in an electronic system.

FIG. 5 is a simplified block diagram illustrating an embodiment of the apparatus of the present invention in electronic system 500. Electronic system 500 can be any of a variety of systems having electronic devices coupled to a bidirectional signal line, such as a computer system. Electronic system 500 includes error insertion apparatus 100, bidirectional signal line 103, and terminals 102 and 104 as described above. Electronic system 500 also includes electronic devices 501 and 502, which can be integrated circuits or any other electronic devices. Electronic devices 501 and 502 are coupled to bidirectional signal line 103 at terminals 102 and 104, respectively, such that an error can be inserted onto bidirectional signal line 103 between electronic devices 501 and 502.

Thus, the exemplary embodiments of the present invention illustrated in FIGS. 1, 3 and 5 have been described. However, the invention is not limited to these embodiments or any of the details described. The specification and drawings must be regarded in an illustrative rather than a restrictive sense. The scope of the invention is defined by the following claims.

What is claimed is:

1. An apparatus for inserting an error signal onto a bidirectional signal line having a first terminal and a second terminal, the apparatus comprising:
   a control unit configured to generate a switch enable signal;
   a first switch responsive to the switch enable signal configured to decouple the first terminal from the second terminal;
   a second switch responsive to the switch enable signal configured to couple the error signal to the first terminal; and
   a third switch responsive to the switch enable signal configured to couple the error signal to the second terminal.

2. The apparatus of claim 1, further comprising an error generation circuit having an input terminal coupled to the first terminal and an output terminal configured to provide the error signal.

3. The apparatus of claim 2, further comprising:
   a first resistor coupled between the output terminal and the second switch; and
   a second resistor coupled between the output terminal and the third switch.

4. The apparatus of claim 2, wherein the error generation circuit comprises a bistable element configured to sample a signal on the bidirectional signal line and having an input terminal coupled to the input terminal of the error generation circuit, an output terminal coupled to the output terminal of the error generation circuit, and a sample enable terminal configured to receive a sample enable signal.

5. The apparatus of claim 4, wherein the control unit comprises a control circuit configured to generate the switch enable signal and the sample enable signal.

6. The apparatus of claim 5, wherein the control circuit comprises a delay circuit having an error insertion clock input terminal configured to receive an error insertion clock signal, the delay circuit configured to delay the assertion of the switch enable signal at least one half period of the error insertion clock signal from the assertion of the sample enable signal.

7. The apparatus of claim 1, wherein the control unit comprises a counter circuit having a system clock input terminal configured to receive a system clock signal, the counter circuit configured to generate a period for the switch enable signal being a multiple of the period of the system clock signal.

8. The apparatus of claim 7, wherein the control unit further includes a configuration signal input configured to receive a configuration signal, the period for the switch enable signal being based on the configuration signal.

9. An apparatus for inserting an error signal onto a bidirectional signal line having a first terminal and a second terminal, the apparatus comprising:
   a control unit configured to generate a switch enable signal;
   means for decoupling the first terminal from the second terminal responsive to the switch enable signal;
   means for coupling the error signal to the first terminal responsive to the switch enable signal; and
   means for coupling the error signal to the second terminal responsive to the switch enable signal.

10. The apparatus of claim 9, further comprising an error generation circuit having an input terminal coupled to the first terminal and an output terminal configured to provide the error signal.

11. An electronic system comprising:
   a bidirectional signal line having a first and a second terminal;
   a first device coupled to the first terminal of the bidirectional signal line;
   a second device coupled to the second terminal of the bidirectional signal line; and
   an apparatus for inserting an error signal onto bidirectional signal line, the apparatus comprising
      a control unit configured to generate a switch enable signal;
      a first switch responsive to the switch enable signal configured to decouple the first terminal from the second terminal;
      a second switch responsive to the switch enable signal configured to couple the error signal to the first terminal; and
      a third switch responsive to the switch enable signal configured to couple the error signal to the second terminal.

12. A method for inserting an error signal onto a bidirectional signal line having a first terminal and a second terminal, the method comprising steps of:
   A) generating the error signal; and
   B) decoupling the first terminal from the second terminal and coupling the error signal to the first and second terminals to insert the error signal onto the bidirectional signal line.

13. The method of claim 12, wherein the step of generating the error signal comprises steps of:
   sampling a signal on the bidirectional signal line to generate a sample of the signal; and
   inverting the sample of the signal to generate the error signal.

14. The method of claim 12, further comprising a step of repeating steps (A) and (B) according to a period.

15. The method of claim 14, further comprising steps of:
   receiving a configuration signal; and
   generating the period from the configuration signal.

16. The method of claim 12, further comprising a step of delaying the assertion of a first signal for initiating step (B) from the assertion of a second signal for initiating step (A).

17. A method for validating the capability of an electronic system to detect an error signal on a bidirectional signal line having a first terminal and a second terminal, the method comprising steps of:
   A) generating the error signal;
   B) decoupling the first terminal from the second terminal and coupling the error signal to the first and second terminals to insert the error signal onto the bidirectional signal line;
   C) observing the response of the electronic system to the error on the bidirectional signal line to generate an observed response; and
   D) comparing the observed response to an expected response to validate the capability of the electronic system to detect the error on the bidirectional signal line.

18. The method of claim 17, wherein the step of generating the error signal comprises steps of:
   A) sampling a signal on the bidirectional signal line to generate a sample of the signal; and
   B) inverting the sample of the signal to generate the error signal.

19. The method of claim 17, further comprising steps of:
   receiving a configuration signal;
   generating a period from the configuration signal; and
   repeating steps (A), (B), (C), and (D) according to the period.

* * * * *

UNITED STATES PATENT AND TRADEMARK OFFICE
CERTIFICATE OF CORRECTION

PATENT NO. : 6,067,647
DATED : May 23, 2000
INVENTOR(S) : Cummins

It is certified that error appears in the above-identified patent and that said Letters Patent is hereby corrected as shown below:

Column 2,
Line 36, delete "tor", insert -- for --.

Column 3,
Line 2, delete "SAMPLE EN", insert -- SAMPLE_EN --.
Line 61, delete "ERR CLK", insert -- ERR_CLK --.

Column 4,
Line 2, delete "ERR CLK", insert -- ERR_CLK --.
Line 25, delete "ERR EN", insert -- ERR_EN --.
Line 25, delete "SAMPLE EN", insert -- SAMPLE_EN --.
Line 28, delete "ERR EN", insert -- ERR_EN --.
Line 28, delete "SAMPLE EN", insert -- SAMPLE_EN --.
Between lines 28 and 29, delete "SWITCH EN", insert -- SWITCH_EN --.

Signed and Sealed this

Third Day of December, 2002

JAMES E. ROGAN
*Director of the United States Patent and Trademark Office*